United States Patent [19]
Ogasawara

[11] Patent Number: 5,502,538
[45] Date of Patent: Mar. 26, 1996

[54] FOCUS DETECTION DEVICE

[75] Inventor: Akira Ogasawara, Kawasaki, Japan

[73] Assignee: Nikon Corporation, Tokyo, Japan

[21] Appl. No.: 458,460

[22] Filed: Jun. 2, 1995

Related U.S. Application Data

[63] Continuation of Ser. No. 197,562, Feb. 17, 1994, abandoned, which is a continuation of Ser. No. 76,956, Jun. 16, 1993, abandoned.

[30] Foreign Application Priority Data

Jun. 19, 1992 [JP] Japan ..................................... 4-161069

[51] Int. Cl.$^6$ .............................. G03B 13/36; H04N 3/14
[52] U.S. Cl. ............................................ 354/402; 348/297
[58] Field of Search ................................... 354/402, 406, 354/407, 408; 250/201.2; 348/297, 298

[56]            References Cited

U.S. PATENT DOCUMENTS 4,479,062  10/1984  Kawasaki et al. .............. 358/213.19 X
4,623,927  11/1986  Hoshino et al. .................... 358/213.19
4,701,626  10/1987  Ishizaki et al. ................ 358/213.19 X

*Primary Examiner*—W. B. Perkey
*Attorney, Agent, or Firm*—Oliff & Berridge

[57]            ABSTRACT

This focus detection device uses electric charge accumulation type photoelectric conversion devices. The time period for the next episode of electric charge accumulation by these photoelectric conversion devices is calculated based upon the time period for the current episode of electric charge accumulation, so as to keep the maximum level of an electrical signal for focus detection output from the photoelectric conversion devices less than or equal to a previously determined target level. The accumulation of electric charge by the photoelectric conversion devices is then performed according to this calculated electric charge accumulation time period, and the resultant electrical signal for focus detection is output. A monitor photoelectric conversion device is provided for monitoring the electric charge accumulation state of the photoelectric conversion devices, and this monitor photoelectric conversion device outputs a monitor electrical signal correlated to the average amount of electric charge accumulation of the photoelectric conversion devices. If the electrical signal for focus detection output by the photoelectric conversion devices comes to exceed the maximum input level for its A/D conversion device, then the standard level for the monitor electrical signal is reduced, so as to ensure quick termination of the next episode of electric charge accumulation by the photoelectric conversion devices.

12 Claims, 9 Drawing Sheets

FOCUS DETECTION DEVICE

This is a continuation of application Ser. No. 08/197,562 filed Feb. 17, 1994, now abandoned, which in turn is a continuation of Ser. No. 08/076,956 filed Jun. 16, 1993, now abandoned.

BACKGROUND OF THE INVENTION

1. Field of the Invention

The present invention relates to a focus detection device, for a camera or the like, which employs electric charge accumulation type photoelectric conversion devices.

2. Description of Related Art

There is a per se known focus detection device which detects the focus adjustment state of a taking lens of a camera or the like by using electric charge accumulation type photoelectric conversion devices. This type of focus detection device comprises an optical system for focus detection, an auto focus sensor module (hereinafter termed an A/F sensor module) which incorporates a pair of A/F sensors, and a calculation device which incorporates a microcomputer. The optical system for focus detection directs onto the pair of A/F sensors a pair of luminous flux from the object to be photographed which have passed through a pair of regions symmetrical with respect to the optical axis of the exit pupil face of the taking lens, and forms an image of the object to be photographed on each of these A/F sensors. Each A/F sensor is made up from a plurality of electric charge accumulation type photoelectric conversion devices, and performs accumulation of electric charge according to the intensity of illumination of the object to be photographed in each of its photoelectric conversion devices for a previously determined time period, and then outputs electrical signals for focus detection corresponding to the distribution intensity of illumination of the image of the object to be photographed. These electrical signals for focus detection are converted into digital signals by an analog to digital converter (hereinafter termed an A/D converter), and then are processed by a predetermined algorithm in a calculation device, so that the defocusing amount of the taking lens is calculated and its state of focusing is obtained. This defocusing amount is defined as the distance between the plane on which an image of the object to be photographed is focused by the taking lens, and the film plane.

The longer is the time of electric charge accumulation, the higher is the level of the output signals from the electric charge accumulation type photoelectric conversion devices, if the intensity of illumination of the object to be photographed remains constant; while, if the time period for each episode of electric charge accumulation is constant, said output signal level is the higher, the greater is the intensity of illumination of the object to be photographed. Because various types of noise component are inevitably present in the output signals from the electric charge accumulation type photoelectric conversion devices, the lower are the levels of the focus detection signals used for the above described focus detection calculation, the worse are their signal to noise ratios S/N, and this may cause erroneous focusing to occur. Thus, it is necessary to control the length of the time period for electric charge accumulation by the electric charge accumulation type photoelectric conversion devices, so as to make the level of the output signals from the electric charge accumulation type photoelectric conversion devices higher than the level for maintaining a predetermined accuracy of focus detection, in order to obtain high accuracy focus detection. This time period for electric charge accumulation needs to be varied between, for example, about ten microseconds and a few hundreds of milliseconds, presupposing a usual range of intensity of illumination for the object to be photographed.

There are two per se known types of control method for the time period for electric charge accumulation, in order to obtain an accurate result from the focus detection process. In the first of these methods, the electric charge accumulation type photoelectric conversion devices are controlled in the following manner. A target output level for the electric charge accumulation type photoelectric conversion devices is set, and, based upon the maximum value or the average value of the output signals for the current episode of electric charge accumulation and upon the value of the electric charge accumulation time period during this episode, the time period for electric charge accumulation for the next episode of electric charge accumulation is calculated with the aim of bringing the output signal level from the electric charge accumulation type photoelectric conversion devices to equal said target output level. This control method is termed auto gain control (referred to as AGC for brevity hereinafter), because it resembles the process of adjustment of the output level automatically by controlling the amplification gain of the amplifiers used in the electrical circuit. Further, this control process is often termed software AGC, because normally it is performed by a microcomputer. With this software AGC, the method of controlling electric charge accumulation based upon the maximum output level among the outputs of the electric charge accumulation type photoelectric conversion devices is termed peak AGC, while the method of controlling electric charge accumulation based upon the average output level among the outputs of a plurality of electric charge accumulation type photoelectric conversion devices is termed average AGC. In general, peak AGC is widely used at the present.

In order to keep the target output level for peak AGC within the maximum input level of the A/D converter which is being used, even when the intensity of illumination of the object to be photographed varies somewhat, it is typically set to about half of the maximum input level of the A/D converter. If this target output level be termed Dobj, the maximum level among the output signal levels of the electric charge accumulation type photoelectric conversion devices attained for this episode of electric charge accumulation be termed Dmax, and the time period for this episode of electric charge accumulation be termed IT(n), then the time period IT(n+1) for the next episode of electric charge accumulation may be obtained by the following equation:

$$IT(n+1) = IT(n) \times Dobj / Dmax \quad (1)$$

Figure 6:
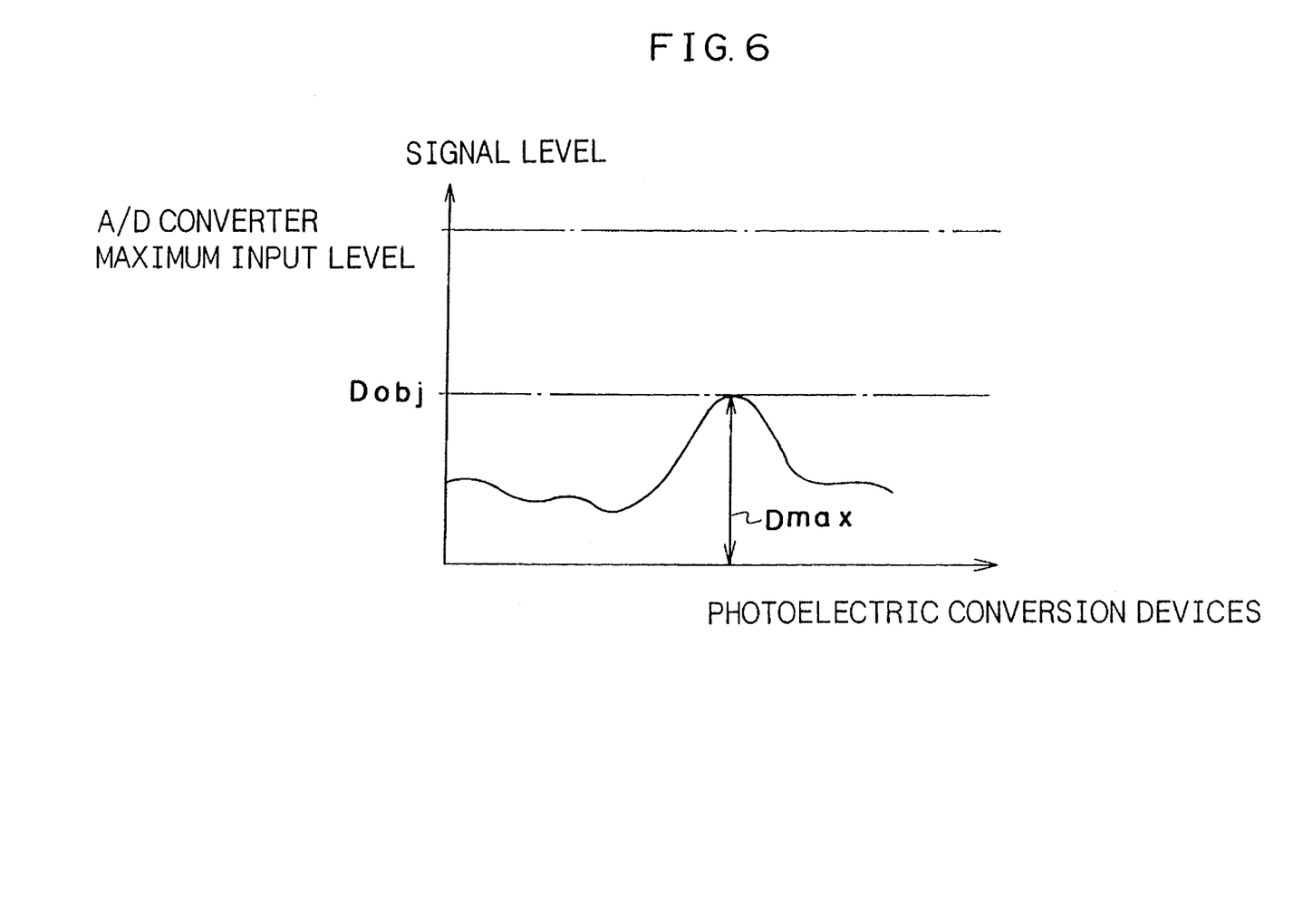
FIG. 6 is a figure showing the output signal levels for electric charge accumulation type photoelectric conversion devices, in the case that electric charge accumulation time period is controlled according to peak AGC.

FIG. 6 is a figure showing the output signal levels for electric charge accumulation type photoelectric conversion devices, in the case that electric charge accumulation time period is controlled according to peak AGC. The electric charge accumulation type photoelectric conversion devices are shown as disposed along the horizontal axis of this figure, while the levels of the output signals of these photoelectric conversion devices are shown along the vertical axis. Although strictly the data for the various photoelectric conversion devices is scattered, nevertheless by the expedient of using this figure a substantially continuous curve can be obtained by connecting together the output levels for the various photoelectric conversion devices.

Another method for controlling the time period for electric charge accumulation by the photoelectric conversion devices is to provide a monitor photodiode neighboring to either one of a pair of A/F sensors, and to terminate electric charge accumulation forcibly when the integrated value of the output signal of said monitor photodiode reaches a previously predetermined standard value. This method is termed hardware AGC, by way of contrast to the software AGC described above.

Figure 7:
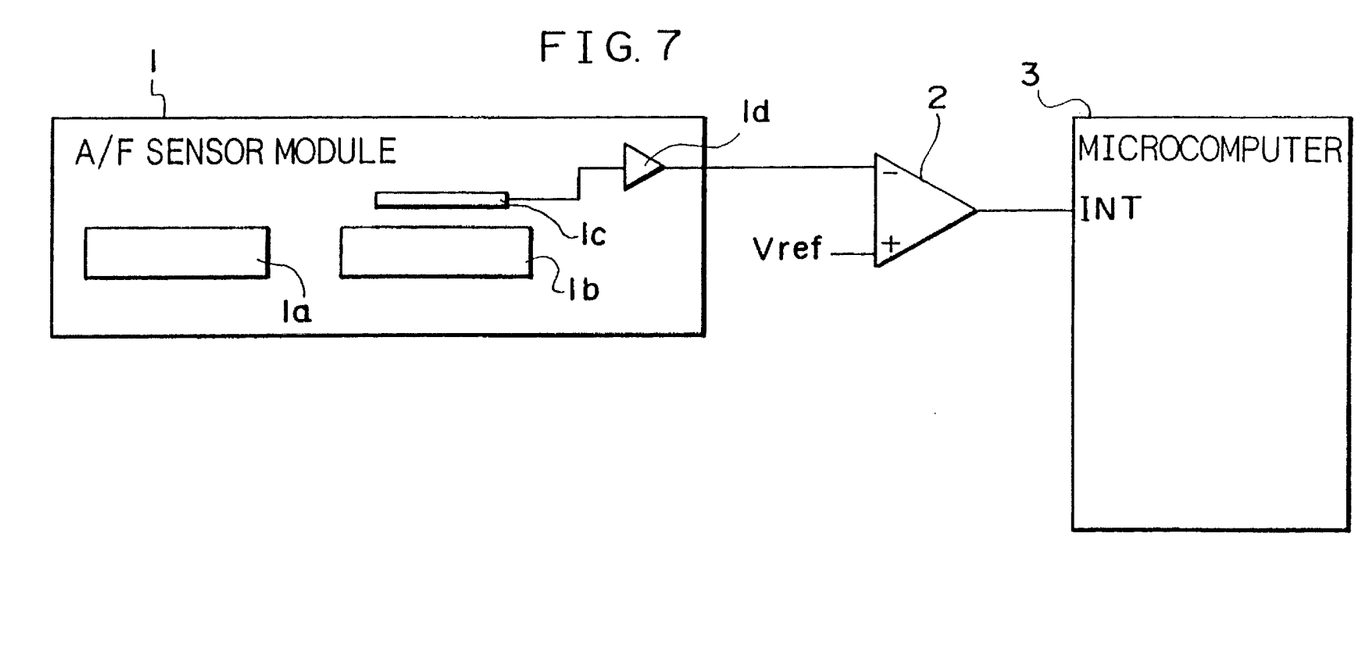
FIG. 7 is a block diagram showing a prior art type of AGC circuit which performs hardware AGC.
Figure 8:
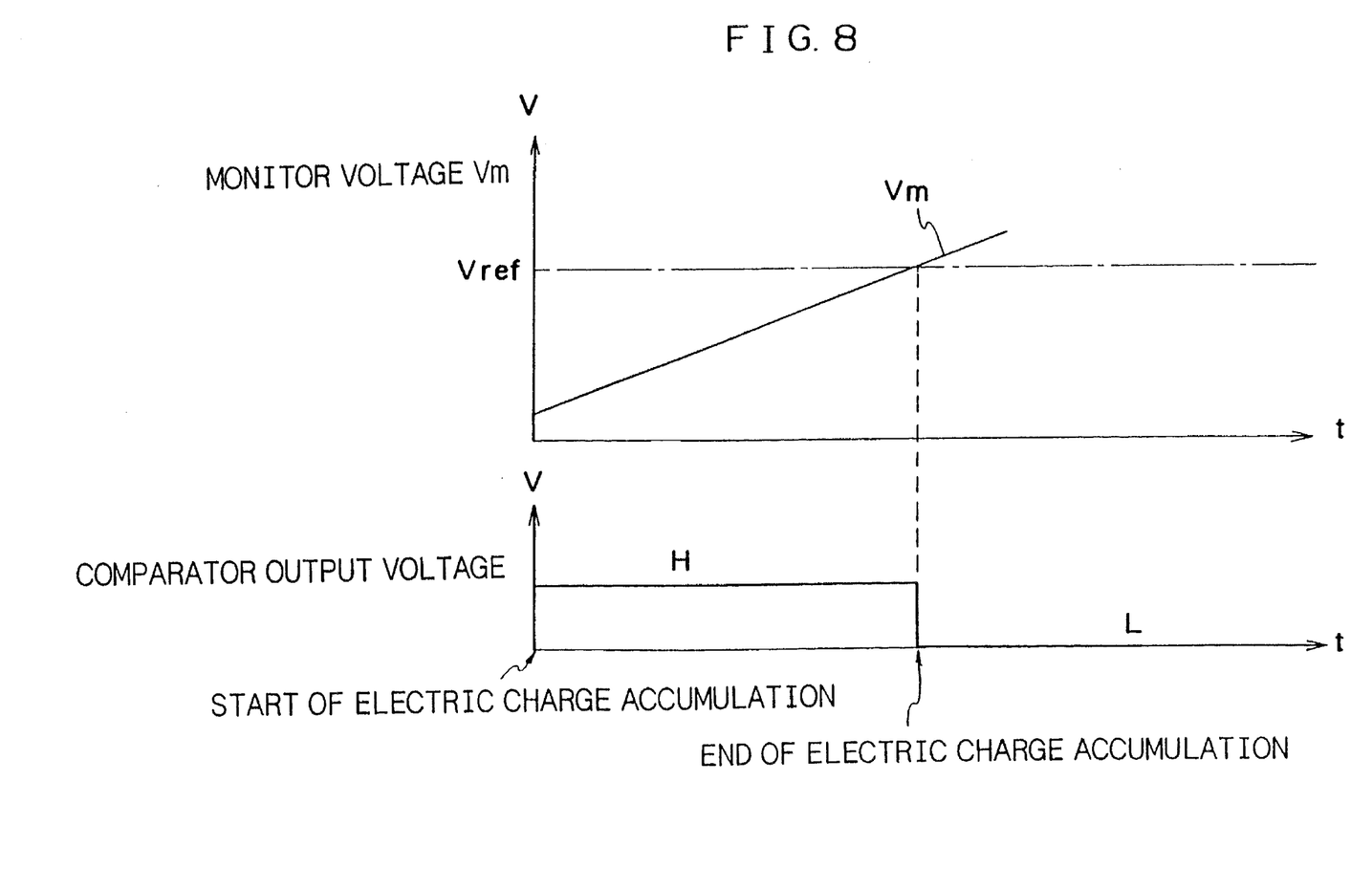
FIG. 8 is a time chart showing the variation of voltage of certain portions of the prior art hardware AGC circuit of FIG. 7.

FIG. 7 is a block diagram showing a prior art type of AGC circuit which performs hardware AGC, while FIG. 8 is a time chart showing the variation of voltage of certain portions of this prior art hardware AGC circuit. In an AF sensor module denoted as 1 and shown as a block there are provided a pair of A/F sensors 1a and 1b and a monitor photodiode 1c which is disposed as neighboring to the A/F sensor 1b. An optical system, not particularly shown, casts an image of the object to be photographed upon the monitor photodiode 1c, said image being almost identical to the image of said object to be photographed which is cast upon the A/F sensor 1b, and accordingly said monitor photodiode 1c outputs a photoelectric current which corresponds to the light intensity of the image of the object to be photographed which is cast upon the A/F sensor 1b. This photoelectric current output by the monitor photodiode 1c is integrated by an amplifier 1d which starts this integration process at the time point of starting of electric charge accumulation by the A/F sensors 1a and 1b, and said amplifier 1d converts said integrated photoelectric current into a voltage signal which it outputs to a comparator 2 as a monitor electrical signal, i.e. as a monitor voltage Vm. This comparator 2 compares the monitor voltage Vm thus generated by the amplifier 1d with a standard voltage Vref, and, as shown in FIG. 8, the output voltage of said comparator 2 remains high level while said monitor voltage Vm remains less than said standard voltage Vref, while said comparator output voltage becomes low level when said monitor voltage Vm attains or becomes greater than said standard voltage Vref. This output of the comparator 2 is supplied to an interrupt terminal INT of a microcomputer 3 which is for controlling electric charge accumulation by the AF sensor module 1, and an interrupt is generated for said microcomputer 3 when said comparator output voltage goes to low level from high level. The interrupt program for the microcomputer 3 which is thus initiated forcibly terminates electric charge accumulation by the A/F sensors 1a and 1b.

The monitor photodiode 1c is disposed adjoining the A/F sensor 1b, and the image of the object to be photographed cast upon said monitor photodiode 1c is almost identical to the image of said object to be photographed which is cast upon the A/F sensor 1b. Therefore, said monitor photodiode 1c outputs a photoelectric current which corresponds to the average amount of electric charge accumulation of the electric charge accumulation type photoelectric conversion devices of said A/F sensor 1b. Accordingly, the monitor voltage Vm output from the amplifier 1d has a voltage value which corresponds to the average value of the focus detection electrical signal which is output from the A/F sensor 1b.

Normally the time period for electric charge accumulation by the A/F sensors 1a and 1b is controlled according to peak AGC. However, because as described above the time period for electric charge accumulation for peak AGC is calculated according to equation (1) when the previous episode of electric charge accumulation has terminated, therefore, if the illumination level of the object to be photographed suddenly increases during the current episode of electric charge accumulation, then it can happen that the level of the electrical signal for focus detection from the A/F sensors 1a and 1b should exceed the maximum input level for the analog to digital converter. In other words, if focus detection calculation is performed based upon this sort of electrical signal for focus detection, the accuracy of focus detection is deteriorated. Therefore, hardware AGC is used as a kind of backup for peak AGC, in consideration of the possibility that the illumination level of the object to be photographed should suddenly change. If in fact the illumination level of the object to be photographed suddenly increases, then the level of the monitor voltage Vm for hardware AGC likewise suddenly increases, and before termination of electric charge accumulation according to peak AGC this monitor voltage Vm reaches the standard value Vref, so that electric charge accumulation by the electric charge accumulation type photoelectric conversion devices are terminated according to hardware AGC.

When the target output level Dobj for hardware AGC and peak AGC is the same, the time period for hardware AGC is set to be longer than the time period for electric charge accumulation calculated for peak AGC. Accordingly, during normal operation, it never happens that during electric charge accumulation according to peak AGC the accumulation of electric charge is forcibly terminated according to hardware AGC. However, when the operator of the camera changes his or her mind as to what object should be photographed so that the level of illumination of the object to be photographed changes abruptly, then it can in fact happen that during electric charge accumulation according to peak AGC the accumulation of electric charge is forcibly terminated according to hardware AGC.

Figure 9:
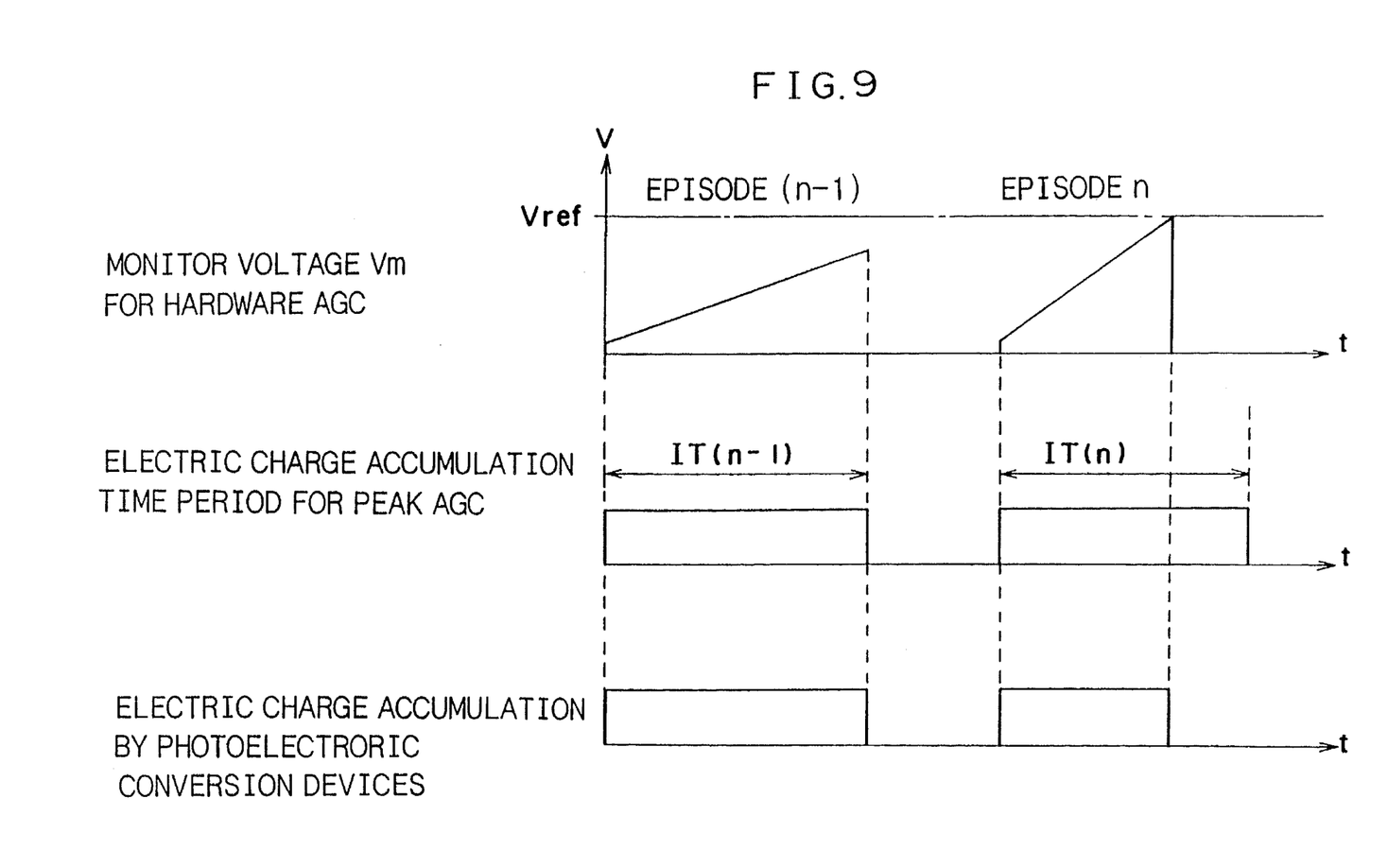
FIG. 9 is a time chart showing a prior art type of electric charge accumulation action according to both peak AGC and hardware AGC.

FIG. 9 is a time chart showing such a prior art type of electric charge accumulation action according to both peak AGC and hardware AGC. After electric charge accumulation has been performed for exactly the time period IT(n−1) during the (n−1)th episode of electric charge accumulation according to peak AGC, suppose that the level of illumination of the object to be photographed increases abruptly: then in the next nth episode of electric charge accumulation the monitor voltage Vm produced from the monitor photodiode 1c abruptly increases, and before the time period IT(n) for electric charge accumulation according to peak AGC has elapsed this monitor voltage Vm reaches the standard voltage Vref, and electric charge accumulation is forcibly terminated according to hardware AGC.

Figure 10:
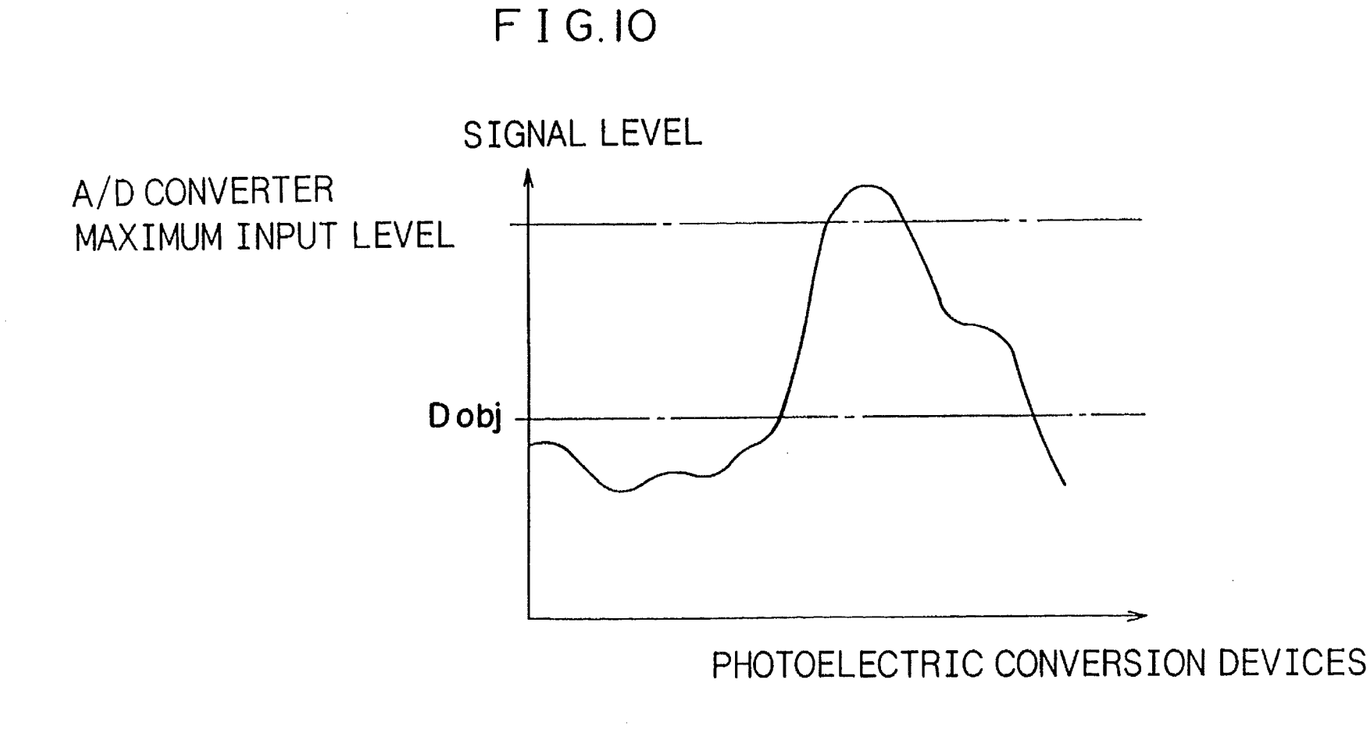
FIG. 10 is a figure showing an electrical signal for focus detection which has exceeded the maximum input level of a comparator.

Incidentally, because objects to be photographed which have high levels of illumination often also have high contrast, even though it is possible to terminate electric charge accumulation by hardware AGC, at this time it can happen that the levels of the output signals of the A/F sensors 1a and 1b, as shown in FIG. 10, may at some time exceed the maximum input value allowable for the A/D converter. Because it therefore might happen that errors in the calculations for focus detection based upon this type of electrical signal for focus detection might become relatively large, it is necessary to keep the output signals from the A/F sensors 1a and 1b at suitable levels by correcting the time period for electric charge accumulation to be relatively short.

However, because an input signal to an A/D converter whose level exceeds the maximum allowable input level for said converter is treated as having said maximum input level and is analog to digital converted accordingly, the method of calculating the time period IT(n+1) for the next episode of electric charge accumulation according to the previously described equation (1) does not yield a suitable result. Therefore, with prior art type peak AGC, if the signal obtained from the AF sensor module 1 overflows the input range of the A/D converter at any time, then instead of using the equation (1) for calculating the time period for the next episode of electric charge accumulation, the following equation should be used:

$$IT(n+1) = IT(n)/4 \tag{2}$$

In other words, if the electrical signal for focus detection overflows, then temporarily the time period for electric charge accumulation is compressed on a large scale according to equation (2), and electric charge accumulation is performed accordingly, so that the level of the output signal for focus detection is reliably kept below the maximum input level for the A/D converter, and subsequently calculation according to equation (1) for peak AGC is reverted to.

Nevertheless, with the prior art focus detection devices described above, when the level of illumination of the object to be photographed increases abruptly and at some time the level of the electrical signal for focus detection output by the A/F sensors exceeds the maximum allowable input level for the A/D converter, then, after performing electric charge accumulation with the time period for electric charge accumulation temporarily reduced according to equation (2) in order as shown in FIG. 6 to keep the maximum value of the electrical signal for focus detection less than the target output level Dobj, for several subsequent electric charge accumulation episodes peak AGC is performed according to equation (1). Accordingly there is a problem in the prior art, when the level of illumination of the object to be photographed changes abruptly, with regard to poor responsiveness of focus detection operation.

SUMMARY OF THE INVENTION

The object of the present invention is to provide a focus detection device which can quickly perform accurate focus detection, even if the level of illumination of the object to be photographed changes abruptly.

In order to attain the above described object, the present invention proposes a focus detection device, comprising: a photoelectric conversion means, which comprises a plurality of A/F sensors each of which comprises a plurality of electric charge accumulation type photoelectric conversion devices and accumulates electric charge corresponding to the light intensity of an image of an object to be photographed which is cast on its said electric charge accumulation type photoelectric conversion devices, said photoelectric conversion means repeatedly outputting an electrical signal for focus detection corresponding to the distribution of light intensity of said image of said object to be photographed; a monitor photoelectric conversion means which is provided adjoining to one of said A/F sensors, and which receives light from said image of said object to be photographed and outputs a monitor electrical signal correlated to the average amount of electric charge accumulation of said electric charge accumulation type photoelectric conversion devices; a focus detection optical system which leads an luminous flux from said object to be photographed which has passed through a photographic optical system onto said A/F sensors of said photoelectric conversion means and onto said monitor photoelectric conversion means, and which focuses said luminous flux into said images thereon of said object to be photographed; an A/D conversion means which converts the electrical signal for focus detection output from said photoelectric conversion means into a digital signal; an electric charge accumulation time period calculation means which, in order to keep the maximum level of the digital signal for focus detection output from said A/D conversion means less than or equal to a previously determined target level, calculates the time period for the next episode of electric charge accumulation based upon the time period for the current episode of electric charge accumulation; a comparison means which compares the level of the monitor electrical signal which is output from said monitor photoelectric conversion means with a standard level, and which outputs an electric charge accumulation termination signal for terminating electric charge accumulation by said photoelectric conversion means, when said monitor electrical signal exceeds said standard level; an electric charge accumulation control means which controls said photoelectric conversion means to perform the accumulation of electric charge according to the electric charge accumulation time period calculated by said electric charge accumulation time period calculation means, and which further controls said photoelectric conversion means to terminate the accumulation of electric charge, when during this electric charge accumulation time period said electric charge accumulation termination signal is output from said comparison means; a focus detection calculation means which calculates the focus adjustment state for said photographic optical system based upon the digital signal for focus detection output from said A/D conversion means; a detection means which detects the fact that the electrical signal for focus detection output by said photoelectric conversion means exceeds the maximum input level for said A/D conversion means; and a standard level switchover means which, when it is detected by said detection means that said electrical signal for focus detection output by said photoelectric conversion means has exceeded the maximum input level for said A/D conversion means, reduces said standard level of said comparison means, so as quickly to terminate the next episode of electric charge accumulation by said photoelectric conversion means.

With this type of focus detection device according to the present invention, the time period for the next episode of electric charge accumulation is calculated based upon the time period for the current episode of electric charge accumulation, in order to keep the maximum level of the electrical signal for focus detection output from the A/F sensors less than or equal to the previously determined target level; and electric charge accumulation by the electric charge accumulation type photoelectric conversion devices is performed during the next episode thereof according to this calculated time period for electric charge accumulation. However, if during this electric charge accumulation time period the monitor electrical signal output from the monitor photoelectric conversion means exceeds the standard level for it as set in the comparison means, so that the comparison means outputs the electric charge accumulation termination signal, then the electric charge accumulation control means controls the photoelectric conversion means so as forcibly to terminate the accumulation of electric charge thereby. Further, if the electrical signal for focus detection output by the electric charge accumulation type photoelectric conversion devices exceeds the maximum input level for the A/D conversion means, then the standard level for the monitor electrical signal in the comparison means is reduced, so as quickly to terminate the next episode of electric charge accumulation by the electric charge accumulation type photoelectric conversion devices. In this manner, even in the event that the illumination level of the object to be photographed changes abruptly or quickly, it is possible quickly to converge the output level of the signal for focus detection output by the electric charge accumulation type photoelectric conversion devices to its target level, and thereby it is possible to enhance the speed and the responsiveness of focus detection.

In the focus detection device as described above, said standard level and its reduced standard level may optionally but desirably be a first standard level and a second standard level which is less than said first standard level, both said standard levels being preset to said comparison means; and in this case said standard level switchover means should select said first standard level when said detection means detects that said electrical signal for focus detection does not exceed the maximum input level for said A/D conversion means, and should switch over from said first standard level to said second standard level when said detection means detects that said electrical signal for focus detection does exceed the maximum input level for said A/D conversion means. Further, in this case, it is further desirable (although optional) for said standard level switchover means to select said second standard level during the episode of electric charge accumulation directly after the start of focus detection operation, i.e. during the first episode of electric charge accumulation.

DESCRIPTION OF THE PREFERRED EMBODIMENT

Figure 1:
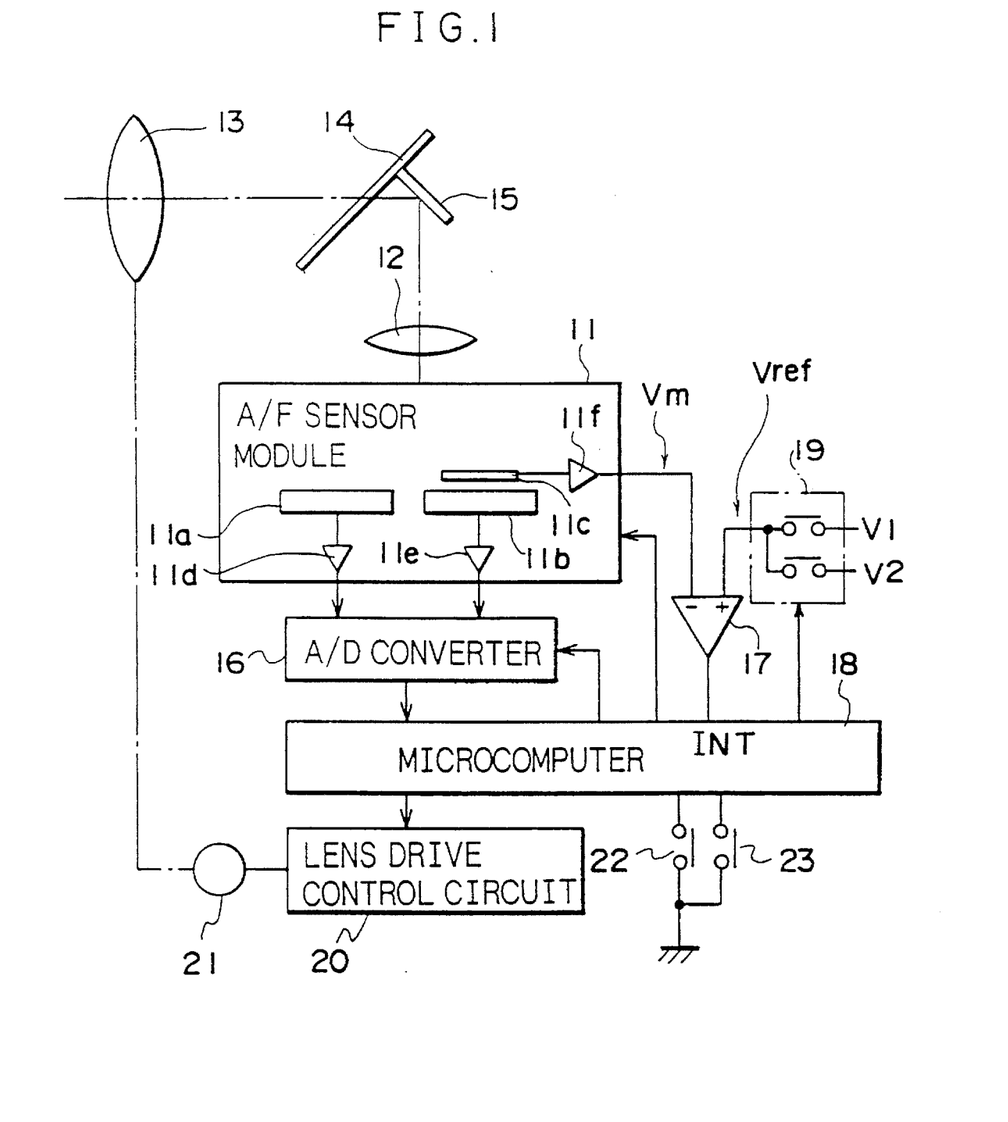
FIG. 1 is a block diagram showing the construction of a camera which incorporates a focus detection device according to the preferred embodiment of the present invention.

FIG. 1 is a block diagram showing the construction of a camera which is equipped with a focus detection device according to the preferred embodiment of the focus detection device according to the present invention. An A/F sensor module denoted as 11 and shown as a block comprises a pair of A/F sensors 11a and 11b, a monitor photodiode 11c which is arranged as neighboring to the A/F sensor 11b, and amplifiers 11d, 11e, and 11e which convert the output signals of the A/F sensor 11a, of the A/F sensor 11b, and of the monitor photodiode 11c respectively into analog output voltage signals. A focus detection optical system 12 casts onto the A/F sensor module 11 a portion of a luminous flux emanating from the object which is to be photographed, after said luminous flux has passed through a taking lens 13 and a main mirror 14 and has been reflected from a sub-mirror 15; and thereby a pair of images of the object to be photographed are cast one onto each of the pair of A/F sensors 11a and 11b. At this time, an image of the object to be photographed is also cast upon the monitor photodiode 11c, said image being almost identical to the image of said object to be photographed which is cast upon the A/F sensor 11b. Each of the A/F sensors 11a and 11b accumulates electric charge according to the distribution of light intensity in the respective image cast upon it of the object to be photographed, and the amplifiers 11d and 11e respectively convert these accumulated electric charge amounts into voltage signals which they output as analog electrical signals for focus detection. Further, the monitor photodiode 11c outputs a photoelectric current which corresponds to the light intensity of the image of the object to be photographed which is cast upon the A/F sensor 11b, and the amplifier 11e integrates this photoelectric current and converts it into a voltage signal which it outputs as a monitor electrical signal, i.e. as a monitor voltage Vm.

An A/D converter 16 converts the analog electrical signals for focus detection from the A/F sensors 11a and 11b via the respective amplifiers 11d and 11e into a digital signal representative thereof, and outputs said digital signal to a microcomputer 18. A comparator 17 compares the monitor voltage Vm from the amplifier 11f with a standard voltage Vref, and said comparator 17 outputs a high level signal to an interrupt terminal INT of the microcomputer 18 while said monitor voltage Vm remains less than said standard voltage Vref, while it outputs a low level signal to said interrupt terminal INT when said monitor voltage Vm becomes greater than said standard voltage Vref. This initiates an interrupt for the microcomputer 18, and as will be explained hereinafter said microcomputer 18 then executes an interrupt program so that the process of electric charge accumulation by the A/F sensor module 11 is terminated. A signal switchover device 19 switches over between two standard voltages V1 and V2 which are different, according to a control signal dispatched from the microcomputer 18 as will also be explained hereinafter. This microcomputer 18 includes per se conventional peripherals such as a memory, a timer, and the like, and, along with performing various forms of control for this camera as a whole, executes a control program which will be explained hereinafter, so as to perform electric charge accumulation control according to peak AGC and hardware AGC. A drive circuit 20 drives a lens drive motor 21 according to a lens drive control signal which is dispatched to said drive circuit 20 by the microcomputer 18, and said lens drive motor 21 thereby moves the taking lens 13 so as to focus it. Moreover, when a release button incorporated in this camera but not shown in the figures is pressed by the camera operator through a first stroke thereof, a first stroke switch 22, which is normally in the OFF state, is closed so as to be in the ON state; and, when said release button is further pressed by the camera operator through a second stroke thereof, a second stroke switch 23, which is also normally in the OFF state, is similarly closed so as to be in the ON state.

In this preferred embodiment of the present invention, the standard voltage Vref for hardware AGC is provided by one or the other of the two voltages V1 and V2. In the case that electric charge accumulation is being performed according to peak AGC of software AGC, when the electrical signal for focus detection is not overflowing over the maximum input level for the A/D converter 16, the standard voltage signal V1 is selected; and, when the brightness level of the object to be photographed suddenly increases and the monitor voltage Vm rises above this standard voltage V1, then electric charge accumulation is terminated according to hardware AGC. When electric charge accumulation has been terminated according to hardware AGC, then the electrical signal for focus detection has overflowed due to the contrast of the object to be photographed being high, and if overflow of the focus detection signal is detected by the microcomputer 18 the standard signal is switched over from the standard voltage V1 to the standard voltage V2 by the signal switchover device 19.

The value of the standard voltage V1 is determined as will now be explained. In the case that an identical distribution of light intensity is cast onto the A/F sensors 11a and 11b and the monitor photodiode 11c, the standard voltage V1 is determined so that the time period for accumulation according to hardware AGC is somewhat longer than the time period for electric charge accumulation calculated using equation (1) according to peak AGC. Further, the standard voltage V2 is determined so that the time period for electric charge accumulation is somewhat shorter than the time period for electric charge accumulation when the standard voltage V1 is set under the above described conditions.

As for the operation of electric charge accumulation process after overflow, because the hardware AGC works according to the standard voltage V2, and the average output level of the electrical signal for focus detection is forced to be low, the chance that this electrical signal for focus detection should overflow a second time during the next episode of electric charge accumulation is low. To put it another way, the value of the standard voltage V2 is determined so that repeated overflow should not occur, or at least should hardly ever occur.

Figure 2:
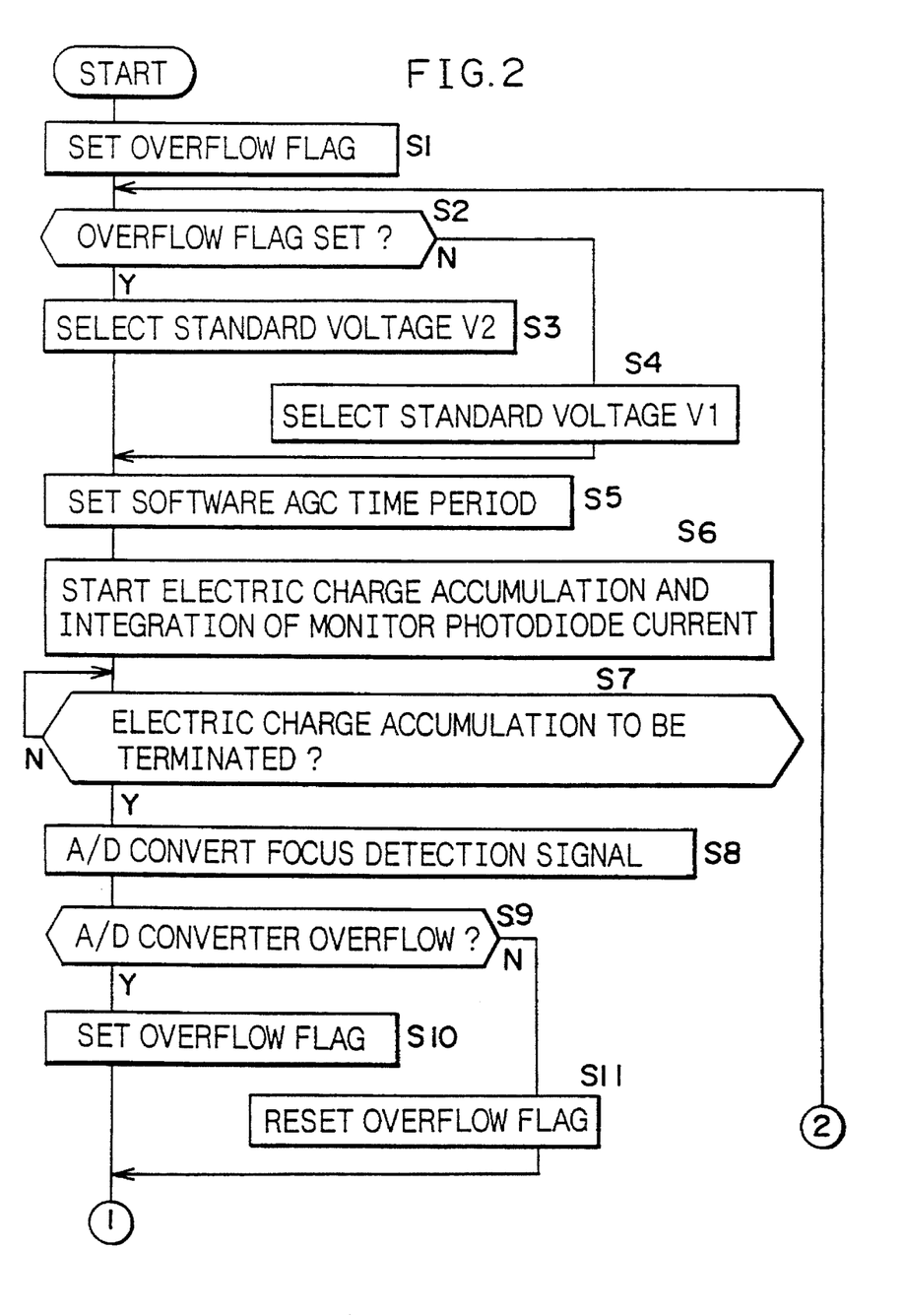
FIGS. 2 and 3 are first and second flow charts showing the operation of a control program executed by a microcomputer incorporated in the camera of FIG. 1.
Figure 3:
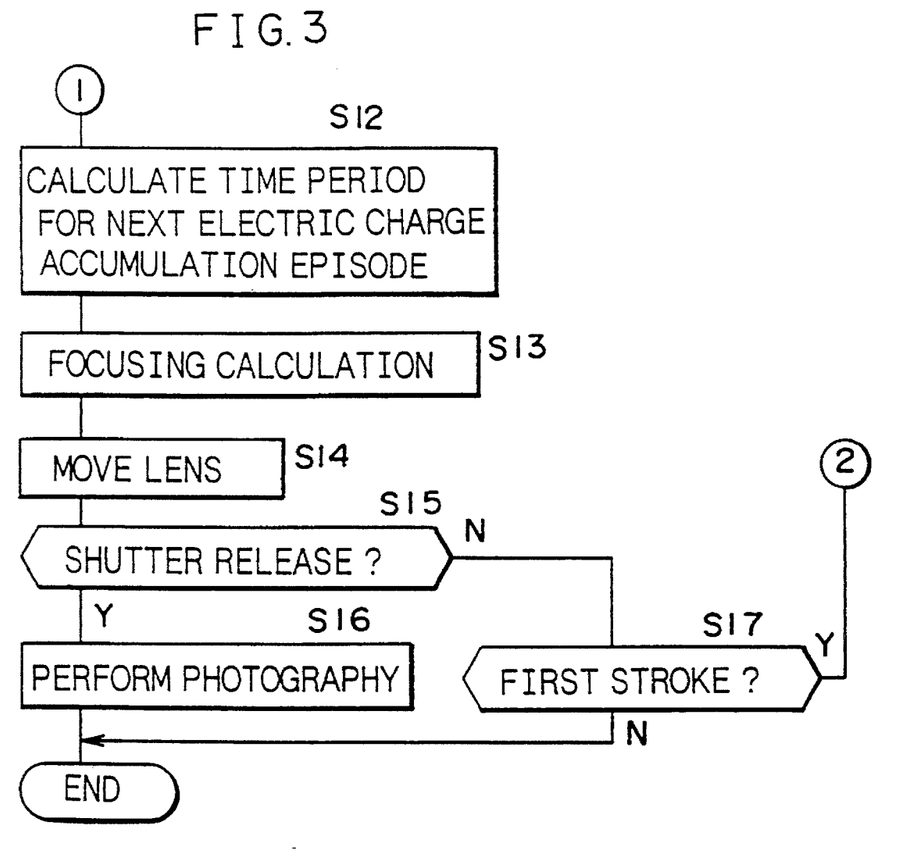

FIGS. 2 and 3 are first and second flow charts showing the flow of the control program executed by the microcomputer 18 incorporated in this camera. The operation of the preferred embodiment of the present invention will now be described with reference to these flow charts. As will be clear from the following descriptions, the main body of this program is repeated in a cycle, with the flow of control returning from the decision step S17 (of FIG. 3) back to the step S2 (of FIG. 2) at the end of each cycle, of course just as long as the condition in the decision step 17 is satisfied.

The microcomputer 18 starts to execute this program when first stroke operation of the release button of the camera is detected by the switch 22. Immediately after the start of program execution, because the accumulation time period IT for peak AGC for the first electric charge accumulation episode cannot be calculated according to the previously stated equation (1), electric charge accumulation control is performed according to hardware AGC. At this time, in order not to cause the electric signal for focus detection for this first episode of electric charge accumulation to overflow, and further in order to converge quickly to normal peak AGC, in the step S1 an overflow flag, which is used for indicating that the electric signal for focus detection has overflowed, is forcibly set (although in fact overflow has of course not actually occurred); and then the flow of control proceeds to the next decision step S2. In this decision step S2, a decision is made as to whether or not this overflow flag is set. If the result of this decision is YES, i.e. if the overflow flag is in fact set, then the flow of control passes next to the step S3, in which the standard voltage V2 is selected for controlling the signal switchover device 19; while on the other hand, if the result of this decision is NO, i.e. if the overflow flag is currently not set, then the flow of control passes next to the step S4, in which the standard voltage V1 is selected for controlling the signal switchover device 19. In either case, after selecting a standard voltage, the flow of control proceeds next to the step S5.

In this step S5, the time interval IT(n) for electric charge accumulation for this time round the main cycle of this program, i.e. for the current electric charge accumulation episode, is set by a timer for electric charge accumulation time control, not shown in the figures; and then the flow of control proceeds to the next step S6. Further, for the first time the main cycle of this program is executed, i.e. at startup for the first episode of electric charge accumulation, because at this initial time it is not possible to calculate the time interval for electric charge accumulation by using the previously described equation (1), instead the initial time interval IT(n) for electric charge accumulation is merely set to a sufficiently long time period.

In the next step S6, the A/F sensor module 11 is controlled so as to start electric charge accumulation, and further integration of the photoelectric current which is output from the monitor photodiode 11c is started, and the flow of control proceeds next to the decision step S7. In this decision step S7, a decision is made as to whether or not the accumulation of electric charge is to be terminated, and if the result of this decision is NO so that electric charge accumulation is to be continued then the flow of control returns to this step S7 again in a tight loop, while on the other hand when electric charge accumulation is to be terminated then the flow of control passes on to the next step S8. I.e., the flow of control passes on to the step S8 either when electric charge accumulation is to be terminated according to peak AGC when the time set on the timer for electric charge accumulation time control has elapsed, or alternatively when electric charge accumulation is to be terminated according to hardware AGC based upon the value of the monitor voltage detected by the monitor photodiode 11c. In this next step S8, the A/D converter 16 is controlled so as to convert into a digital signal the analog electrical signals for focus detection output by the A/F sensors 11a and 11b; and then the flow of control proceeds to the next decision step S9.

In this decision step S9, a decision is made as to whether or not the signal for focus detection has overflowed over the maximum input level for the A/D converter 16. For example, if an 8-bit A/D converter 16 is being employed, then if the focus detection signal as converted into a digital signal reaches the signal level 255, then this signal may be considered to have overflowed. If the result of this decision is YES, i.e. if overflow of the focus detection signal is detected, then the flow of control passes next to the step S10; while on the other hand, if the result of this decision is NO, i.e. if no overflow of the focus detection signal is detected, then the flow of control passes next to the step S11. In the step S10, at which point the occurrence of overflow of the focus detection signal has been detected, the overflow flag is set; while on the other hand in the step S11, at which point it is decided that overflow of focus detection signal has not occurred, the overflow flag is reset. In either case, the flow of control proceeds next to the step S12 of the FIG. 3 flow chart.

In this step S12 the time period IT(n+1) for the next episode of electric charge accumulation, i.e. for the next time around the main cycle of this program, is calculated according to the equation (1) described above; and then the flow of control proceeds to the next step S13. In this step S13, the amount of defocusing is calculated, based upon the electrical signals for focus detection, and the amount of movement required in order properly to focus the taking lens 13 of the camera is calculated; and then the flow of control proceeds to the next step S14. In this step S14, the drive circuit 20 is controlled, based upon this calculated amount of desired lens movement, so as to drive the taking lens 13 so as to focus it properly; and then the flow of control proceeds to the next decision step S15. In this decision step S15, a decision is made as to whether or not the switch 23 is ON, i.e. as to whether the release button of the camera is being pressed by the operator as far as its second stroke in order to release the shutter and initiate photography. If the result of this decision is YES, i.e. if the switch 23 is ON, then the flow of control passes next to the step S16; while on the other hand, if the result of this decision is NO, i.e. if the switch 23 is not ON, then the flow of control passes next to the decision step S17. In the step S16, photography is performed, and then the flow of control proceeds the end of this computer program and program execution is terminated, with, in this case, a photograph having been taken. On the other hand, in the decision step S17, a decision is made from the output from the switch 22 as to whether or not the release button of the camera is still being pressed as far as its first stroke position. If the result of this decision is YES, i.e. if the release button is still being pressed as far as its first stroke position, then the flow of control returns to the step S2 of the FIG. 2 program portion, to cycle around again; while on the other hand, if the result of this decision is NO, i.e. if the release button is no longer being pressed as far as its first stroke position, then the flow of control proceeds the end of this computer program and program execution is terminated without any photograph having been taken. Explanation of the actual process of photography as performed in the step S16 will be omitted from this account in the interests of brevity of description, since it has no direct relevance to the principles of the present invention.

Figure 4:
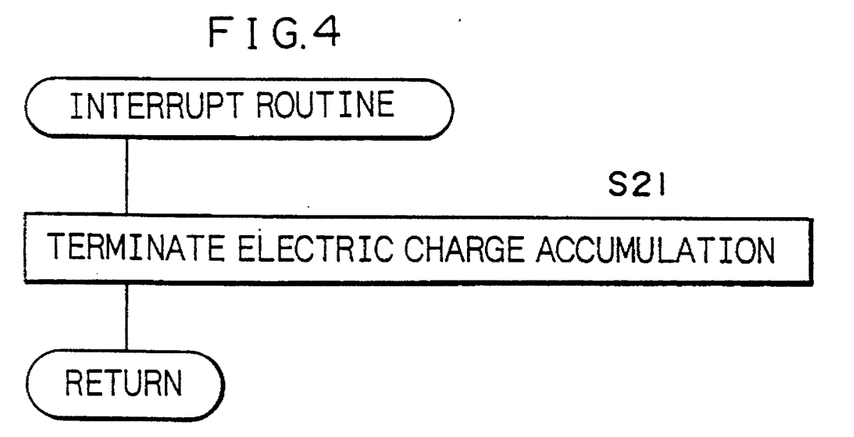
FIG. 4 is a flow chart of an interrupt routine for said microcomputer.

If, during the period of electric charge accumulation according to peak AGC of software AGC, the monitor voltage Vm detected by the monitor photodiode 11c exceeds the standard voltage (which is set to either V1 or V2), then hardware AGC operates, and an interrupt is generated for the microcomputer 18. At this time the microcomputer 18 executes the interrupt routine for which a flow chart is shown in FIG. 4, and in the sole step S21 thereof the A/F sensor module 11 is controlled so as to terminate the accumulation of electric charge.

Figure 5:
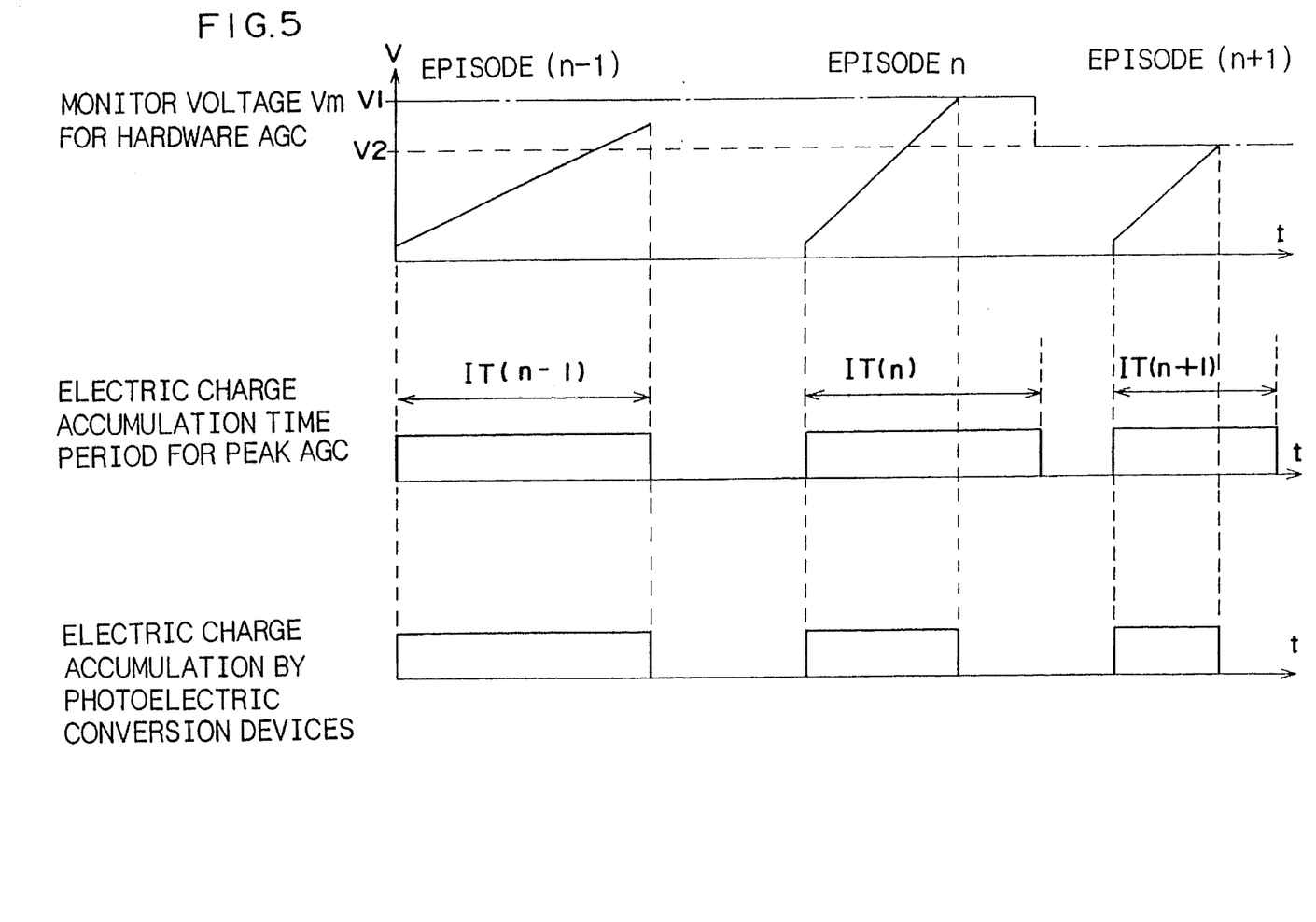
FIG. 5 is a time chart showing electric charge accumulation action according to peak AGC and hardware AGC.

FIG. 5 is a time chart which shows the operation of peak AGC and hardware AGC. Suppose that the illumination level of the object to be photographed is suddenly increased after electric charge accumulation has been performed for exactly the accumulation time period IT(n−1) during the (n−1)th electric charge accumulation episode, i.e. has been performed according to peak AGC the (n−1)th time around the cycle of the program of FIGS. 2 and 3; then, in the calculation of the accumulation time period IT(n) for the nth electric charge accumulation episode, i.e. according to peak AGC the nth time around the program cycle, this change of illumination level of the object to be photographed exerts no influence on the calculation, and the accumulation time period IT(n) is calculated according to the equation (1) based upon the focus detection signals obtained by electric charge accumulation for the (n−1)th episode, i.e. the (n−1)th time around the program cycle.

Subsequently, during the nth electric charge accumulation episode, i.e. when actually accumulating electric charge the nth time around the program cycle, because the illumination level of the object to be photographed has increased, the monitor voltage Vm output from the monitor photodiode 11c exhibits a sudden upward slope, and before the time period IT(n) for electric charge accumulation according to peak AGC calculated as described above has elapsed the monitor voltage Vm from the monitor photodiode 11c reaches the standard level VI, and electric charge accumulation is terminated according to hardware AGC. If it is detected that the focus detection signal due to electric charge accumulation has overflowed during the nth electric charge accumulation episode, i.e. the nth time around the program cycle, then the standard voltage for hardware AGC for the (n+1)th electric charge accumulation episode, i.e. for when accumulating electric charge the (n+1)th time around the program cycle, is switched over to V2. As for peak AGC, even if overflow of the focus detection signal is detected, the time period IT(n+1) for electric charge accumulation for the next episode of electric charge accumulation, i.e. for the next time round the program cycle, is not compressed temporarily on a large scale as in the prior art, but on the contrary the time period IT(n+1) for the next episode of electric charge accumulation for the next time round the program cycle is calculated according to equation (1) based upon the focus detection signal for this current electric charge accumulation episode, i.e. for the nth time round the program cycle. Accordingly, this time period IT(n+1) for electric charge accumulation for the next electric charge accumulation episode is only made as much smaller than the electric charge accumulation period IT(n) for this electric charge accumulation episode by an amount just corresponding to the amount of increase in the illumination level of the object to be photographed.

As for the next episode of electric charge accumulation, i.e. the (n+1)th time round the program cycle, since the illumination level of the object to be photographed is higher than before, the monitor voltage from the monitor photodiode 11c suddenly climbs. Thus, before the time period IT(n+1) for electric charge accumulation according to peak AGC has elapsed, the monitor voltage Vm attains the standard voltage V2, and electric charge accumulation is terminated according to hardware AGC. Because as described above the standard voltage V2 is set to a voltage level suitable for non repetition of the overflow of the electrical signal for focus detection, thereby during the next electric charge accumulation cycle, i.e. the (n+2)th time around the program cycle, as shown in FIG. 6, the probability of obtaining a reasonable level for the electrical signal for focus detection is high.

In this manner, if the electrical signal for focus detection detected by the A/F sensor module 11 overflows the maximum input level of the A/D converter 16, the standard voltage V1 is switched to the standard voltage V2 which quickly terminates electric charge accumulation, and because it is compared with the monitor voltage Vm from the monitor photodiode 11c, even if overflow of the electrical signal for focus detection occurs, it is possible to cause the outputs from the A/F sensors 11a and 11b quickly to converge on a reasonable level, and even if the brightness of the object to be photographed changes quickly accurate focus detection can be quickly performed.

Further, when accumulating electric charge directly after the start of focus detection operation, i.e. during the first episode of electric charge accumulation, because the present invention provides for electric charge accumulation according to hardware AGC to be performed by switching over from the normal standard voltage V1 to the standard voltage V2 for when overflowing, the possibility that the electrical signal for focus detection the first time round the program cycle will overflow is reduced, and it is possible to ensure quick convergence to the normal peak AGC.

The number and the disposition of the A/F sensors and the monitor photodiodes in the A/F sensor module are not to be considered as being limited to those shown and described above according to the particular constructional details of the preferred embodiment of the present invention. In fact the present invention can also be applied to a focus detection device which, by using a plurality of pairs of A/F sensors, performs focus detection for a plurality of areas in the photographic field.

In the above described preferred embodiment of the present invention, the comparator 17 was used in order to compare the monitor voltage and the standard voltage, and the signal switchover device 19 was used in order to switch over between the standard voltage V1 and the standard voltage V2; but this is not an essential feature of the present invention, and as an alternative it would also be possible for the A/D converter 16 to convert the monitor voltage into a digital signal, which would then be compared by the microcomputer 18 with a digital value representing the standard voltage V1 or the standard voltage V2. Other variations can also be easily envisaged by one of ordinary skill in the art, based upon the disclosure herein. Accordingly, although the present invention has been shown and described in terms of the preferred embodiment thereof, it is not to be considered as limited by any of the perhaps quite fortuitous details of said embodiment, or of the drawings, but only by the terms of the appended claims, which follow.

We claim:

1. A focus detection device, comprising:
   (a) a photoelectric conversion circuit, which comprises a plurality of auto focus sensors each of which comprises a plurality of electric charge accumulation type photoelectric conversion devices and accumulates electric charge corresponding to the light intensity of an image of an object to be photographed which is cast on its said electric charge accumulation type photoelectric conversion devices, said photoelectric conversion circuit repeatedly outputting an electrical signal for focus detection corresponding to the distribution of light intensity of said image of said object to be photographed;
   (b) a monitor photoelectric conversion circuit which receives light from said image of said object to be photographed and outputs a monitor electrical signal correlated to the average amount of electric charge accumulation of said electric charge accumulation type photoelectric conversion devices;
   (c) a focus detection optical system which leads a luminous flux from said object to be photographed which has passed through a photographic optical system onto said auto focus sensors of said photoelectric conversion circuit and onto said monitor photoelectric conversion circuit, and which focuses said luminous flux into said images thereon of said object to be photographed;
   (d) an analog to digital conversion circuit which converts the electrical signal for focus detection output from said photoelectric conversion circuit into a digital signal;
   (e) an electric charge accumulation time period calculation circuit which, in order to keep the maximum level of the digital signal for focus detection output from said analog to digital conversion circuit less than or equal to a previously determined target level, calculates the time period for the next episode of electric charge accumulation based upon the time period for the current episode of electric charge accumulation;
   (f) a comparison circuit which compares the level of the monitor electrical signal which is output from said monitor photoelectric conversion circuit with a standard level, and which outputs an electric charge accumulation termination signal for terminating electric charge accumulation by said photoelectric conversion circuit, when said monitor electrical signal exceeds said standard level;
   (g) an electric charge accumulation control circuit which controls said photoelectric conversion circuit to perform the accumulation of electric charge according to the electric charge accumulation time period calculated by said electric charge accumulation time period calculation circuit, and which further controls said photoelectric conversion circuit to terminate the accumulation of electric charge, when during this electric charge accumulation time period said electric charge accumulation termination signal is output from said comparison circuit;
   (h) a focus detection calculation circuit which calculates the focus adjustment state for said photographic optical system based upon the digital signal for focus detection output from said analog to digital conversion circuit;
   (i) a detection circuit which detects the fact that the electrical signal for focus detection output by said photoelectric conversion circuit exceeds the maximum input level for said analog to digital conversion circuit; and
   (j) a standard level switchover circuit which, when it is detected by said detection circuit that said electrical signal for focus detection output by said photoelectric conversion circuit has exceeded the maximum input level for said analog to digital conversion circuit, reduces said standard level of said comparison circuit, so as quickly to terminate the next episode of electric charge accumulation by said photoelectric conversion circuit.

2. A focus detection device according to claim 1, wherein said standard level and its reduced standard level are a first standard level and a second standard level which is less than said first standard level, both said standard levels being preset to said comparison circuit; and wherein said standard level switchover circuit selects said first standard level when said detection circuit detects the fact that said electrical signal for focus detection does not exceed the maximum input level for said analog to digital conversion circuit, and switches over from said first standard level to said second standard level when said detection circuit detects the fact that said electrical signal for focus detection does exceed the maximum input level for said analog to digital conversion circuit.

3. A focus detection device according to claim 2, wherein said standard level switchover circuit selects said second standard level during the episode of electric charge accumulation immediately after the start of focus detection operation.

4. A focus detection device, comprising:
   (a) a photoelectric conversion circuit, which comprises a plurality of auto focus sensors each of which comprises a plurality of electric charge accumulation type photoelectric conversion devices and accumulates electric charge corresponding to the light intensity of an image of an object to be photographed which is cast on its said electric charge accumulation type photoelectric conversion devices, said photoelectric conversion circuit repeatedly outputting an electrical signal for focus detection corresponding to the distribution of light intensity of said image of said object to be photographed;
   (b) a monitor photoelectric conversion circuit which receives light from said image of said object to be photographed and outputs a monitor electrical signal correlated to the average amount of electric charge accumulation of said electric charge accumulation type photoelectric conversion devices;

(c) a focus detection optical system which leads a luminous flux from said object to be photographed which has passed through a photographic optical system onto said auto focus sensors of said photoelectric conversion circuit and onto said monitor photoelectric conversion circuit, and which focuses said luminous flux into said images thereon of said object to be photographed;

(d) an analog to digital conversion circuit which converts the electrical signal for focus detection output from said photoelectric conversion circuit into a digital signal;

(e) an electric charge accumulation time period calculation circuit which, in order to keep the maximum level of the digital signal for focus detection output from said analog to digital conversion citcuit less than or equal to a previously determined target level, calculates the time period for the next episode of electric charge accumulation based upon the time period for the current episode of electric charge accumulation;

(f) a comparison circuit which compares the level of the monitor electrical signal which is output from said monitor photoelectric conversion circuit with a standard level, and which outputs an electric charge accumulation termination signal for terminating electric charge accumulation by said photoelectric conversion circuit, when said monitor electrical signal exceeds said standard level;

(g) an electric charge accumulation control circuit which controls said photoelectric conversion circuit to perform the accumulation of electric charge according to the electric charge accumulation time period calculated by said electric charge accumulation time period calculation circuit, and which further controls said photoelectric conversion circuit to terminate the accumulation of electric charge, when during this electric charge accumulation time period said electric charge accumulation termination signal is output from said comparison circuit;

(h) a focus detection calculation circuit which calculates the focus adjustment state for said photographic optical system based upon the digital signal for focus detection output from said analog to digital conversion circuit;

(i) a detection circuit which detects the fact that the electrical signal for focus detection output by said photoelectric conversion circuit exceeds the maximum input level for said analog to digital conversion circuit; and (j) a standard level switchover circuit which selects a first standard level when said detection circuit detects the fact that said electrical signal for focus detection does not exceed the maximum input level for said analog to digital conversion circuit, and switches over from said first standard level to a second standard level which is less than said first standard level when said detection circuit detects the fact that said electrical signal for focus detection does exceed the maximum input level for said analog to digital conversion circuit and during the episode of electric charge accumulation immediately after the start of focus detection operation.

5. A method of detecting the focus adjustment state of a taking lens for a focus detection device, which employs electric charge accumulation type photoelectric conversion device and a monitor photoelectric conversion device for monitoring the electric charge accumulation state of said photoelectric conversion devices, which comprises the steps of:

calculating the time period for the next episode of electric charge accumulation by said photoelectric conversion devices based upon the time period for the current episode of electric charge accumulation;

performing the accumulation of electric charge by said photoelectric conversion devices according to said calculated electric charge accumulation time period;

terminating the electric charge accumulation by said photoelectric conversion devices if the monitor output from said monitor photoelectric conversion device comes to exceed a standard level; and reducing the standard level for the monitor output if a focus detection output from said photoelectric conversion devices comes to exceed the maximum input level for its analog to digital conversion device.

6. A focus detection device, comprising:

(a) a photoelectric conversion circuit, which comprises a plurality of auto focus sensors each of which comprises a plurality of electric charge accumulation type photoelectric conversion devices and accumulates electric charge corresponding to the light intensity of an image of an object to be photographed which is cast on its said electric charge accumulation type photoelectric conversion devices, said photoelectric conversion circuit repeatedly outputting an electrical signal for focus detection corresponding to the distribution of light intensity of said image of said object to be photographed;

(b) a monitor photoelectric conversion circuit which is provided adjoining to one of said auto focus sensors, and which receives light from said image of said object to be photographed and outputs a monitor electrical signal correlated to the average amount of electric charge accumulation of said electric charge accumulation type photoelectric conversion devices;

(c) a focus detection optical system which leads a luminous flux from said object to be photographed which has passed through a photographic optical system onto said auto focus sensors of said photoelectric conversion circuit and onto said monitor photoelectric conversion circuit, and which focuses said luminous flux into said images thereon of said object to be photographed;

(d) an analog to digital conversion circuit which converts the electrical signal for focus detection output from said photoelectric conversion circuit into a digital signal;

(e) an electric charge accumulation time period calculation circuit which, in order to keep the maximum level of the digital signal for focus detection output from said analog to digital conversion circuit less than or equal to a previously determined target level, calculates the time period for the next episode of electric charge accumulation based upon the time period for the current episode of electric charge accumulation;

(f) a comparison circuit which compares the level of the monitor electrical signal which is output from said monitor photoelectric conversion circuit with a standard level, and which outputs an electric charge accumulation termination signal for terminating electric charge accumulation by said photoelectric conversion circuit, when said monitor electrical signal exceeds said standard level;

(g) an electric charge accumulation control circuit which controls said photoelectric conversion circuit to perform the accumulation of electric charge according to the electric charge accumulation time period calculated by said electric charge accumulation time period calculation circuit, and which further controls said photoelectric conversion circuit to terminate the accumulation of electric charge, when during this electric charge accumulation time period said electric charge accumulation termination signal is output from said comparison circuit;

(h) a focus detection calculation circuit which calculates the focus adjustment state for said photographic optical system based upon the digital signal for focus detection output from said analog to digital conversion circuit;

(i) a detection circuit which detects the fact that the electrical signal for focus detection output by said photoelectric conversion circuit exceeds the maximum input level for said analog to digital conversion circuit; and (j) a standard level switchover circuit which, when it is detected by said detection circuit that said electrical signal for focus detection output by said photoelectric conversion circuit has exceeded the maximum input level for said analog to digital conversion circuit, reduces said standard level of said comparison circuit, so as quickly to terminate the next episode of electric charge accumulation by said photoelectric conversion circuit.

7. A focus detection device according to claim 6, wherein said standard level and its reduced standard level are a first standard level and a second standard level which is less than said first standard level, both said standard levels being preset to said comparison circuit; and wherein said standard level switchover circuit selects said first standard level when said detection circuit detects the fact that said electrical signal for focus detection does not exceed the maximum input level for said analog to digital conversion circuit, and switches over from said first standard level to said second standard level when said detection circuit detects the fact that said electrical signal for focus detection does exceed the maximum input level for said analog to digital conversion circuit.

8. A focus detection device according to claim 7, wherein said standard level switchover circuit selects said second standard level during the episode of electric charge accumulation immediately after the start of focus detection operation.

9. A focus detection device, comprising:

(a) a focus detection circuit which comprises an electric charge accumulation type sensor and detects the focus adjustment state for a taking lens;

(b) a monitor circuit which outputs a monitor signal which corresponds to the average amount of electric charge accumulation of said electric charge accumulation type sensor;

(c) a comparison circuit which compares the level of the monitor signal which is output from said monitor circuit with a standard level, and which outputs an electric charge accumulation termination signal when said monitor signal exceeds said standard level; and (d) an electric charge accumulation control circuit which, when said electric charge accumulation termination signal is output from said comparison circuit, controls said electric charge accumulation type sensor to terminate the accumulation of electric charge, and which, during the episode of electric charge accumulation immediately after the power is supplied, reduces said standard level of said comparison circuit, so as quickly to terminate the electric charge accumulation by said electric charge accumulation type sensor.

10. A focus detection device according to claim 9, wherein said standard level and its reduced standard level are a first standard level and a second standard level which is less than said first standard level, both said standard levels being preset to said comparison circuit; and wherein said electric charge accumulation control circuit selects said second standard level during the episode of electric charge accumulation immediately after the power is supplied, and selects said first standard level during next episode of electric charge accumulation.

11. A focus detecting device, comprising:

(a) a focus detection circuit which comprises an electric charge accumulation type sensor and detects the focus adjustment state for a taking lens;

(b) a monitor circuit which outputs a monitor signal which corresponds to the average amount of electric charge accumulation of said electric charge accumulation type sensor;

(c) a comparison circuit which compares the level of the monitor signal which is output from said monitor circuit with a standard level, and which outputs an electric charge accumulation termination signal when said monitor signal exceeds said standard level; and (d) an electric charge accumulation control circuit which, when said electric charge accumulation termination signal is output from said comparison circuit, controls said electric charge accumulation type sensor to terminate the accumulation of electric charge, and which, during the episode of electric charge accumulation immediately after a fixed operation is performed, reduces said standard level of said comparison circuit, so as quickly to terminate the electric charge accumulation by said electric charge accumulation type sensor.

12. A focus detecting device according to claim 11, wherein said fixed operation is a first stroke operation of the shutter release button of the camera.

* * * * *